US011328247B2

(12) United States Patent
Ivester (10) Patent No.: US 11,328,247 B2
(45) Date of Patent: May 10, 2022

(54) PACKAGE DELIVERY WITH MESSAGE MANAGEMENT

(71) Applicant: M. Allen Ivester, Greenville, SC (US)

(72) Inventor: M. Allen Ivester, Greenville, SC (US)

(73) Assignee: EMOTIONAL COMMERCE, LLC, Greenville, SC (US)

( * ) Notice: Subject to any disclaimer, the term of this patent is extended or adjusted under 35 U.S.C. 154(b) by 121 days.

(21) Appl. No.: 16/168,145

(22) Filed: Oct. 23, 2018

(65) Prior Publication Data
US 2019/0130352 A1     May 2, 2019

Related U.S. Application Data

(60) Provisional application No. 62/642,692, filed on Mar. 14, 2018, provisional application No. 62/576,223, filed on Oct. 24, 2017.

(51) Int. Cl.
*G06Q 10/08*     (2012.01)
*H04L 51/10*     (2022.01)

(52) U.S. Cl.
CPC ..... *G06Q 10/0833* (2013.01); *G06Q 10/0832* (2013.01); *H04L 51/10* (2013.01)

(58) Field of Classification Search
CPC ................................................ G06Q 10/08
See application file for complete search history.

(56) References Cited

U.S. PATENT DOCUMENTS

| 2007/0214044 A1* | 9/2007 | Lee ................... G06Q 30/0273 705/14.54 |
| 2011/0218862 A1* | 9/2011 | Langston ........... G06Q 30/0641 705/14.69 |
| 2012/0022924 A1 | 1/2012 | Runnels et al. |
| 2012/0271732 A1 | 10/2012 | Glass et al. |
| 2013/0226728 A1* | 8/2013 | Oghittu .............. G06Q 30/0621 705/26.5 |
| 2013/0346337 A1* | 12/2013 | O'Donnell ......... G06Q 10/0833 705/333 |
| 2014/0089128 A1 | 3/2014 | Stauffer et al. |
| 2014/0207579 A1* | 7/2014 | LeBrun .................. G06Q 50/01 705/14.66 |
| 2015/0074205 A1* | 3/2015 | Westphal ................ H04L 51/14 709/206 |
| 2015/0332062 A1* | 11/2015 | McReynolds ........... H04L 51/32 726/28 |
| 2016/0026249 A1 | 1/2016 | Glass et al. |
| 2016/0232480 A1* | 8/2016 | Erez .................... G06Q 30/0635 |
| 2018/0241871 A1* | 8/2018 | Sarafa ............... H04W 12/0013 |

OTHER PUBLICATIONS

Penttilä, Lauri. "Predicting the use of Online Video Advertising through Marketing Neuropsychology: Effect of Emotionalized Online Video Content." (2016). (Year: 2016).*
International Search Report and Written Opinion of the International Searching Authority for International Application No. PCT/US2018/057118 dated Jan. 4, 2019.

* cited by examiner

*Primary Examiner* — Scott M Tungate
(74) *Attorney, Agent, or Firm* — Nelson Mullins Riley & Scarborough LLP (57) ABSTRACT

A message platform configured to receive video message data and correlate the video message data with shipping data associated with one or more items, generate a packing slip with a unique identifier, receive a message retrieval request based on the unique identifier, and cause the video message data to be transmitted to a recipient user device.

18 Claims, 6 Drawing Sheets

PACKAGE DELIVERY WITH MESSAGE MANAGEMENT

CROSS-REFERENCE TO RELATED APPLICATIONS

This application claims priority to U.S. Provisional Patent Application No. 62/576,223, filed Oct. 24, 2017, and U.S. Provisional Patent Application No. 62/642,692, filed Mar. 14, 2018, both entitled "Package Delivery With Message Management", wherein the foregoing are incorporated by reference in its entirety herein.

TECHNICAL FIELD

The invention generally relates to online order processing and, more particularly, relates to managing a video message in response to a package delivery or gift card purchase.

BACKGROUND OF THE INVENTION

In recent years, online shopping and gift cards have replaced a significant portion of traditional gift purchases. Online shopping offers the advantage of the gift being sent directly to the recipient, but removes some of the personal and emotional qualities of giving the gift in person, or even sending the gift personally. For example, giving a gift in person allows the sender to give a personal message directly to the recipient. In another example, sending the gift personally may allow the sender to wrap the gift in a meaningful wrapping, include a card, note, or other personalized items. Although some online retailers allow for wrapping and personal notes to be added to a gift package, these wrappings and notes tend to be sterile, limited in size and/or content, and lack a personal connection with the sender or recipient. Similarly, gift cards are convenient for the purchaser, are available for a plethora of retailers, and allow the recipient to choose a gift that they will truly like. However, gift cards are also somewhat sterile and often lack a personal connection with the sender or recipient.

BRIEF SUMMARY OF THE INVENTION

In an example embodiment, a message platform is provided including processing circuitry configured to receive video message data, cause the video message data to be stored to a database, cause a packing slip to be generated including a unique identifier associated with video message data, receive a message retrieval request from a user device based on the unique identifier, verify security requirement is met, and transmit the video message data to the user device.

In another embodiment, a message platform is provided which includes processing circuitry configured to receive video message data, cause the video message data to be stored in a database, cause a gift card to be imbedded with a unique identifier associated with the video message data, receive a message retrieval request from a user device based on the unique identifier, verify the security requirement is met, and transmit the video message data to the user device.

In still another embodiment, a message platform is provided which includes processing circuitry configured to receive video message data associated with a unique identifier, cause the video message data to be stored in a database, receive a message retrieval request from a user device based on the unique identifier, verify one or more security requirements are met, and transmit the video message data to the user device.

BRIEF DESCRIPTION OF THE DRAWING(S)

Having thus described the message platform in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

As used herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Along with numerous other advantages, the message platform described herein enables the sender to record a video message to be delivered with a package, physical gift card, or digital gift card, each in a secure manner, e.g. only the recipient can access the video. To the extent the delivery is a package, the package may contain anything known in the art. The package may be a gift, but need not be a gift. For example, the package may contain a scarf, a bottle of perfume, a neck tie, or a new toy and the personalized message may contain a personalized birthday wish or a Valentine's Day greeting. Alternatively, the package may contain industrial supplies and the personalized message may contain instructions for usage thereof. In another embodiment, the package may contain food ingredients and the personalized message may be a short recitation of a favorite recipe. Any items known in the art may be contained within the package and any message known in the art may accompany the package. As will be understood, the gift card may be a physical gift card (printed paper or a plastic card) or may be a digital gift card, emailed or otherwise electronically transmitted to the recipient. Like the package, the gift card may be from any retailer known in the art that is capable of providing gift cards. In another embodiment, the gift card is related to goods or services provided directly by the purchaser to the recipient (i.e. a free night of babysitting).

In some embodiments, the video message is provided from the owner of the company that manufactures the product, from a related vendor, or from some other commercial enterprise. In this embodiment, the video message may contain instructions for using a coupon code or may contain advertising content. In an embodiment, two video messages may be provided to the recipient, a personalized message from the sender/purchaser and an advertising/marketing message from the retailer or distributor. In still another embodiment, the recipient may be required or encouraged to view a short advertising video from the retailer prior to or after display of their personalized message from the sender/purchaser. In an embodiment, the recipient may be permitted or encouraged to share the video message, such as via email, SMS messaging, or social media outlets.

In an embodiment, the package and/or physical gift card is purchased in a brick and mortar store. In this embodiment, the system may provide the in-store purchaser with a unique identifier or code upon an in-store purchase of a gift or physical gift card. For example, the unique identifier may be pre-printed on a tag affixed to the item being purchased or on the gift card itself. The unique code may be temporarily hidden under a removable sticker or a scratch-off material. In another embodiment, the unique identifier may be generated at the time of purchase, on a gift receipt, for example, or on a sticker that can be affixed to the item purchased or the packaging of the item being purchased. The unique identifier may allow the user to scan a code using an electronic device, such as a mobile phone, and upload a video to a database for delivery to the recipient of the gift or gift card.

Alternatively, an item, gift, physical gift card, or digital gift card may be purchased online by a remote purchaser. In this embodiment, a purchaser may access any online retailer and purchase an item or gift card. At that time, a unique code may be generated by the inventive system to allow a user to upload a video message and to allow a recipient to retrieve the video message from a host server associated with the message platform. In some embodiments, the unique code may be placed in the package, such as on the packing slip, gift receipt, or taped across packing material in a prominent location, such as to prompt the recipient to look at the unique identifier before opening the package fully. If the item purchased is a gift card, the unique code may be embedded in, embossed on, or engraved on the gift card.

The unique identifier may be a quick response (QR) code, uniform resource locator (URL), or the like. In one embodiment, the QR code may be utilized by both the purchaser and the recipient. In other embodiments, the QR code may be utilized by only the recipient.

For example, if a gift or gift card is purchased in a store, the QR code may be presented on the item itself or on an affiliated tag. The purchaser may exit the store after purchase, access the QR code (i.e. remove any sticker or scratch-off material), scan the QR code, and may be directed to record and upload a video with a personal message. If the gift or gift card is purchased online, the retailer website may have a link or plugin which allows the purchaser to record and upload a video with a personal message. In either case, the gift or gift card may then be mailed to the recipient.

The recipient may scan the QR code using a mobile device or enter a URL into a web browser causing the video message to be retrieved from the database and displayed to the recipient. This may be the same QR code used by the purchaser or it may be a different QR code. In either case, a personal message can be delivered to the recipient at the time of opening the package to increase the personal and emotional value of the package itself.

In some instances, additional security features may be utilized to further safeguard the privacy of the video message. For example, location restrictions on the message may be implemented. In one example, a geofence may be set around the specified delivery location, such as 100 meters, 0.25 miles, or the like. The message platform may verify any request for the video originates from a user device within the geofence. The user device may be verified within the geofence by location data associated with the user device, such as GPS, proximity detection, or the like, or based on communication protocol identifiers, such as an IP address, router identifiers, cell tower identifiers, or any other identifier in the communication path which identifies the user device location within the geofence.

In an example embodiment, the security feature may be time based, such as enabling retrieval of the video message data only after a time period for delivery has expired or after the carrier updating the package status as delivered. This may prevent persons in the delivery chain from accessing the video message data. Similarly, the system may prevent viewing of the message after a certain amount of time has passed.

In some instances an authentication code may be delivered separate from the package, such as by email, short message service (SMS), traditional mail, voice message, or the like. The message service may prompt the recipient for the authorization code in response to receiving the message request, prior to transmitting the video message data. This may prevent persons other than the intended recipient from accessing the video, even after delivery at the delivery location.

In another embodiment, the unique identifier may be utilized to establish video or telephonic communication between the recipient user device and the sender's user device. For example, the QR code may cause a web based communication interface to open on the recipient user device and call the sender. The sender may answer the web call and be virtually present for the opening of the package. In some embodiments, the QR code may be used to establish cellular based communication, such as telephone or video conferencing.

In an embodiment, the inventive system utilizes an open application programming interface (API). In this embodiment, any developer may pass a video file to a particular path and receive a QR code in return. The QR code can be applied to any object, webpage, or the like, and can be scanned to retrieve the video file. The landing page that is displayed to the user when viewing the file is customizable by the developer. For example, a company logo can be added. Similarly, Cascading Style Sheets (CSS) styling and/or color-related properties and values may be customized to color the text, backgrounds, borders, and other elements of the landing page to fit company branding.

Example System Architecture

Figure 1:
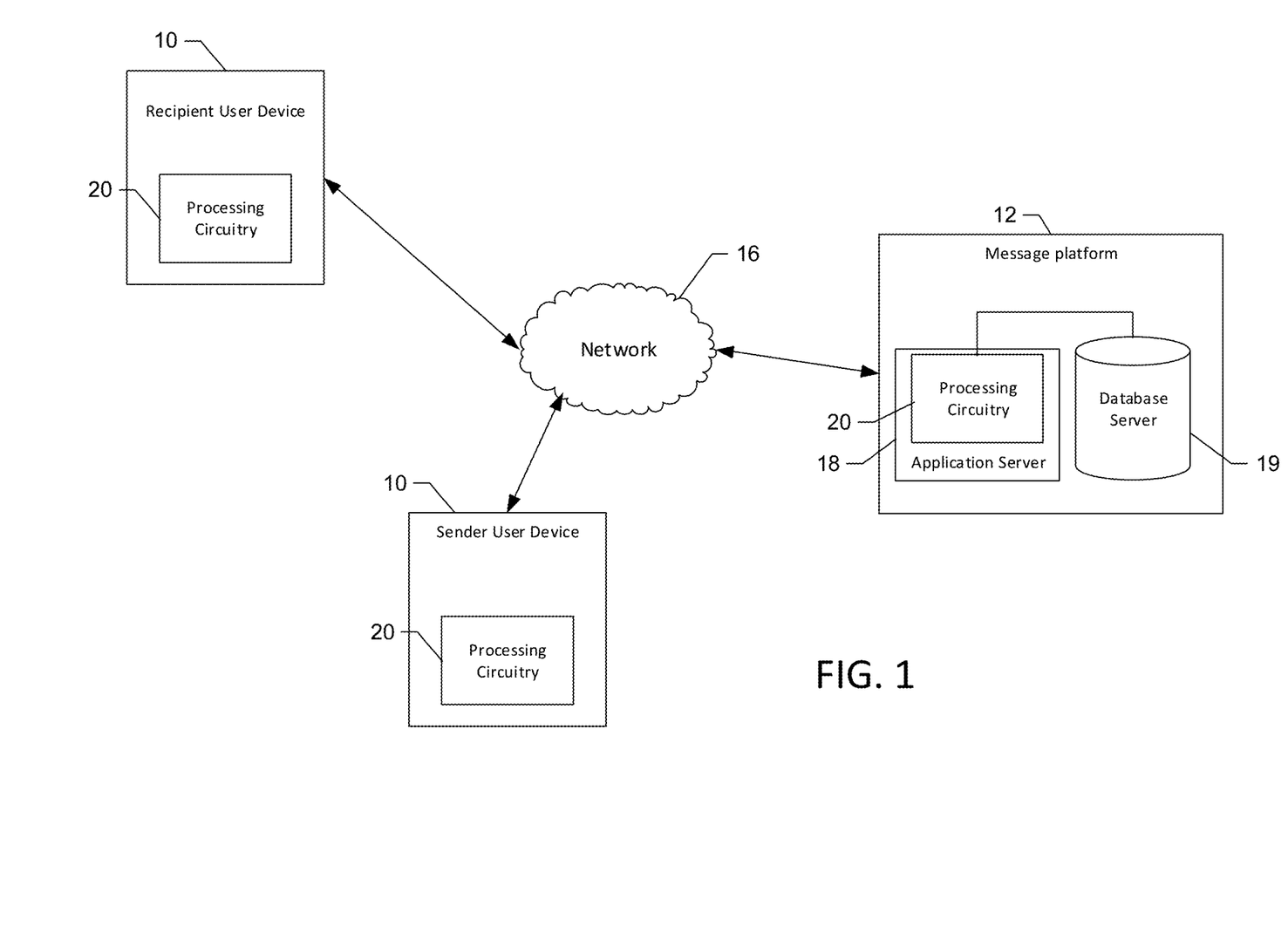
FIG. 1 illustrates a block diagram of a system according to an example embodiment.

FIG. 1 illustrates an example system in which an embodiment of the present invention may be employed. The system may include one or more user devices 10, e.g. a sender user device and a recipient user device. Each one of the user devices 10 may include or otherwise be embodied as computing device (e.g. a computer, a network access terminal, a personal digital assistant (PDA), cellular phone, smart phone, mobile device, wearable device or wearable computer, or the like) capable of communication with a network 16. As such, for example, each one of the user devices 10 may include (or otherwise have access to) memory for storing instructions or applications for the performance of various functions and a corresponding processor or processing circuitry 20 for executing stored instructions or applications. Each one of the user devices 10 may also include software and/or corresponding hardware for enabling the performance of the respective functions of the user devices 10, as described below. In an example embodiment, one or more of the user devices 10 may include a client application configured to operate in accordance with an example embodiment of the present invention. In this regard, for example, the client application may include software for enabling a respective one of the user devices 10 to communicate with the network 16 for requesting and/or receiving information and/or services via the network 16. Moreover, in some embodiments, the information or services that are requested via the network may be provided in software as a service (SAS) environment. The information or services receivable at the client applications may include deliverable components (e.g. downloadable software to configure the user devices 10, or information for consumption/processing at the user devices 10). As such, for example, the client application may include corresponding executable instructions for configuring the user devices 10 to provide corresponding functionalities for message servicing, as described in greater detail below.

The network 16 may be a data network, such as a local area network (LAN), a metropolitan area network (MAN), a wide area network (WAN) (e.g. the Internet), and/or the like, which may couple the user devices 10 to devices such as processing elements (e.g. personal computers, server computers or the like) and/or databases. Communication between the network 16, the user devices 10 and the devices or databases (e.g. servers) to which the user devices 10 are coupled may be accomplished by either wireline or wireless communication mechanisms and their corresponding communications protocols.

In an example embodiment, devices to which the user devices 10 may be coupled via the network 16 may include one or more servers, e.g. application servers 18 and/or database servers 19 (e.g. message platform 12). It is noted that the example embodiments of the system discussed herein are scalable to include any number of servers or user devices 10. Similarly, message platform 12 may have one or a plurality of application servers 18 and/or database servers 19. Although the application server 18 and the database server 19 are each referred to as "servers," this does not necessarily imply that they are embodied on separate servers or devices. As such, for example, a single server or device may include both entities and the database server 19 could merely be represented by a database or group of databases physically located on the same server or device as the application server 18. The application server 18 and the database server 19 may each include hardware and/or software for configuring the application server 18 and the database server 19, respectively, to perform various functions. As such, for example, the application server 18 may include processing circuitry 20, including a processor and memory enabling the application server 18 to access and/or execute stored computer readable instructions for performing various functions. In an example embodiment, one function that may be provided by the application server 18 may be the provision of access to information and/or services related to operation of the terminals or computers with which the user devices 10 are associated. For example, the application server 18 may be configured to provide for storage of information descriptive of financial account data or product pricing data. In some cases, these contents may be stored in the database server 19. Alternatively or additionally, the application server 18 may be configured to provide analytical tools for use by the user devices 10 in accordance with example embodiments.

In an example embodiment, the user devices 10 and/or the message platform 12 may be in data communication with one or more online retailers or e-commerce stores via the network 16. The message platform may enable installation of a message application plugin or other utility to an online retailer website, such as a portion of the checkout selections. As described below, the message device may enable recording of an audio message, a video message, a combination thereof, and/or generation of a unique identifier to be included in a package, for the recipient to retrieve the recorded message. The message platform 12 may be a portion of or communicate with any retailer with an online checkout process. Some example retailers may include, without limitation, WooCommerce, Shopify, Magento, Amazon, Wal-Mart, Etsy, Target, E-Bay, or any other retailer.

Figure 2:
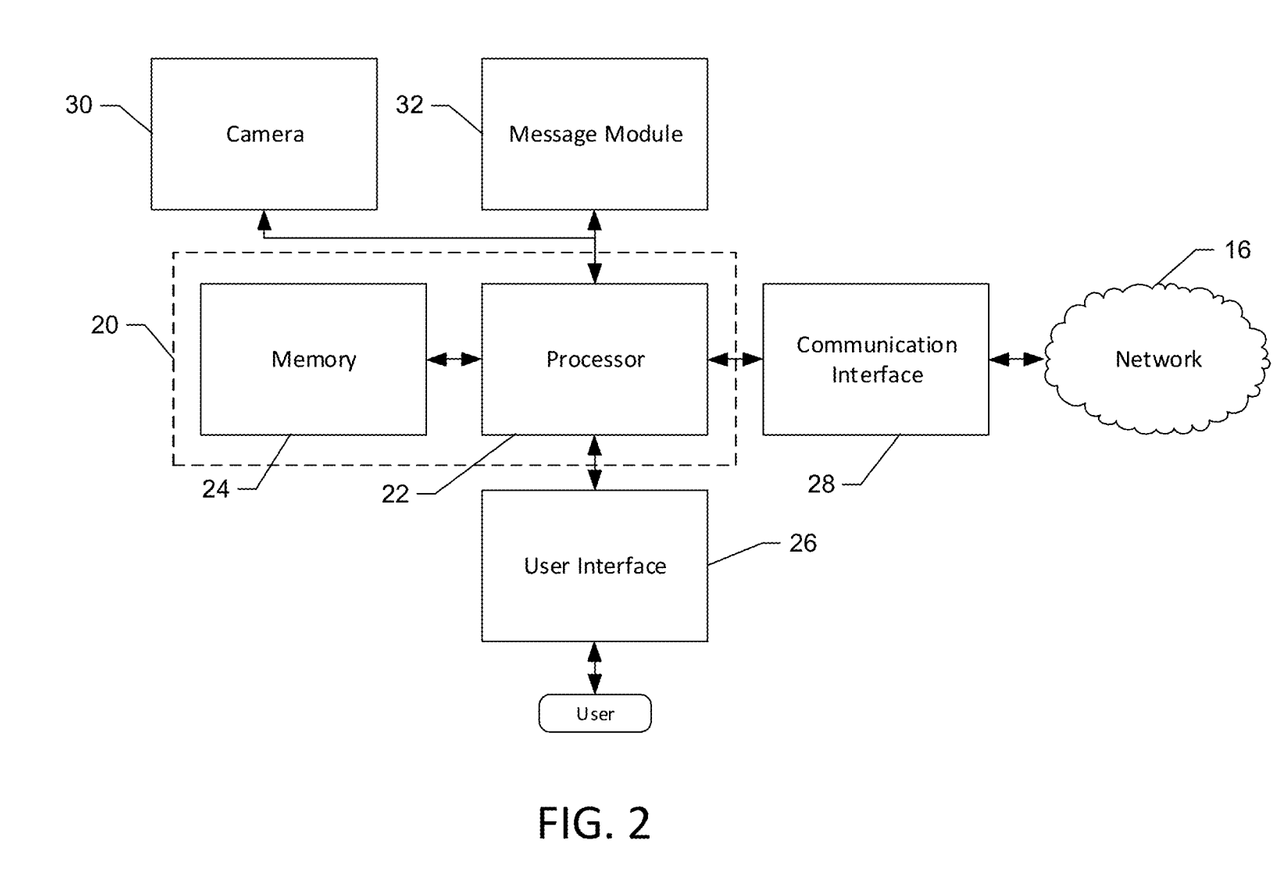
FIG. 2 illustrates a block diagram of an apparatus for an message platform according to an example embodiment.

In some embodiments, for example, the application server 18 may therefore include an instance of a message module 32, shown in FIG. 2, comprising stored instructions for handling activities associated with practicing example embodiments as described herein. As such, in some embodiments, the user devices 10 may access the message module 32 online and utilize the services provided thereby. However, it should be appreciated that in other embodiments, the message module 32 may be provided from the application server 18 (e.g. via download over the network 16) to one or more of the user devices to enable recipient user devices 10 to instantiate an instance of the message module 32 for local operation. As yet another example, the message module 32 may be instantiated at one or more of the user devices 10 responsive to downloading instructions from a removable or transferable memory device carrying instructions for instantiating the message module 32 at the corresponding one or more of the user devices 10. In such an example, the network 16 may, for example, be a peer-to-peer (P2P) network where one of the user devices includes an instance of the message module 32 to enable one of the user devices to act as a server to the other user devices. In a further example embodiment, the message module 32 may be distributed amongst one or more user devices 10 and/or the application server 18.

In an example embodiment, the application server 18 may include or have access to memory (e.g. internal memory or the database server 19) for storing instructions or applications for the performance of various functions and a corresponding processor for executing stored instructions or applications. For example, the memory may store the message module 32 configured to operate in accordance with an example embodiment of the present invention. In this regard, for example, the message module 32 may include software for enabling the application server 18 to communicate with the network 16 and/or the agent device 10 for the provision and/or receipt of information associated with performing activities as described herein. Moreover, in some embodiments, the application server 18 may include or otherwise be in communication with an access terminal (e.g. a computer including a user interface) via which analysts may interact with, configure or otherwise maintain the system.

An example embodiment will now be described with reference to FIG. 2. FIG. 2 shows certain elements of an apparatus for management video messages associated with a package for delivery according to an example embodiment. The apparatus of FIG. 2 may be employed, for example, on a device (e.g. any of the user devices 10 of FIG. 1) or a variety of other devices (such as, for example, a network device, server, proxy, or the like (e.g. an application server 18 of FIG. 1)). Alternatively, embodiments may be employed on a combination of devices. Accordingly, some embodiments of the present invention may be embodied wholly at a single device (e.g. the application server 18 or one or more user devices 10) or by devices in a client/server relationship (e.g. the application server 18 and one or more user devices 10). Furthermore, it should be noted that the devices or elements described below may not be mandatory and thus some may be omitted in certain embodiments.

In an example embodiment, the apparatus may include or otherwise be in communication with processing circuitry 20 that is configured to perform data processing, application execution and other processing and management services according to an example embodiment of the present invention. In one embodiment, the processing circuitry 20 may include a memory 24 and a processor 22 that may be in communication with or otherwise control a user interface 26 and a communication interface 28. As such, the processing circuitry 20 may be embodied as a circuit chip (e.g. an integrated circuit chip) configured (e.g. with hardware, software or a combination of hardware and software) to perform operations described herein. However, in some embodiments, the processing circuitry 20 may be embodied as a portion of a server, computer, laptop, workstation or even one of various mobile computing devices or wearable computing devices. In situations where the processing circuitry 20 is embodied as a server or at a remotely located computing device, the user interface 26 may be located on another device (e.g. at a computer terminal or client device such as one of the user devices 10) that may be in communication with the processing circuitry 20 via the device interface 28 and/or a network (e.g. network 16).

The user interface 26 may be an input/output device for receiving instructions directly from a user. The user interface 26 may be in communication with the processing circuitry 20 to receive a user input via the user interface 26 and/or to present output to a user as, for example, audible, visual, mechanical or other output indications. The user interface 26 may include, for example, a keyboard, a mouse, a joystick, a display (e.g. a touch screen display), a microphone, a speaker, or other input/output mechanisms. Further, the processing circuitry 20 may comprise, or be in communication with, user interface circuitry configured to control at least some functions of one or more elements of the user interface 26. The processing circuitry 20 and/or user interface circuitry may be configured to control one or more functions of one or more elements of the user interface 26 through computer program instructions (e.g. software and/or firmware) stored on a memory device accessible to the processing circuitry 20 (e.g. volatile memory, non-volatile memory, and/or the like). In some example embodiments, the user interface circuitry is configured to facilitate user control of at least some functions of the apparatus through the use of a display configured to respond to user inputs. The processing circuitry 20 may also comprise, or be in communication with, display circuitry configured to display at least a portion of a user interface 26, the display and the display circuitry configured to facilitate user control of at least some functions of the apparatus.

The communication interface 28 may be any means embodied in either hardware (e.g., device or circuitry), software, or a combination of hardware and software that is configured to receive and/or transmit data from/to a network and/or any other device or module in communication with the apparatus. The communication interface 28 may also include, for example, an antenna (or multiple antennas) and supporting hardware and/or software for enabling communications with the network 16 or other devices (e.g. an agent device 10). In some environments, the communication interface 28 may alternatively or additionally support wired communication. As such, for example, the communication interface 28 may include a communication modem and/or other hardware/software for supporting communication via cable, digital subscriber line (DSL), universal serial bus (USB) or other mechanisms. In an exemplary embodiment, the communication interface 28 may support communication via one or more different communication protocols and/or methods. In some cases, IEEE 802.15.4 based communication techniques such as ZigBee or other low power, short range communication protocols, such as a proprietary technique based on IEEE 802.15.4 may be employed along with radio frequency identification (RFID) or other short range communication techniques.

In an example embodiment, the memory 24 may include one or more non-transitory storage or memory devices such as, for example, volatile and/or non-volatile memory that may be either fixed or removable. The memory 24 may be configured to store information, data, applications, instructions or the like for enabling the apparatus to carry out various functions in accordance with example embodiments of the present invention. For example, the memory 24 could be configured to buffer input data for processing by the processor 22. Additionally or alternatively, the memory 24 could be configured to store instructions for execution by the processor 22. As yet another alternative, the memory 24 may include one of a plurality of databases (e.g. database server 19) that may store a variety of files, contents or data sets. Among the contents of the memory 24, applications (e.g. client applications or service application) may be stored for execution by the processor 22 in order to carry out the functionality associated with each respective application.

The processor 22 may be embodied in a number of different ways. For example, the processor 22 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 22 may be configured to execute instructions stored in the memory 24 or otherwise accessible to the processor 22. As such, whether configured by hardware or software methods, or by a combination thereof, the processor 22 may represent an entity (e.g. physically embodied in circuitry) capable of performing operations according to embodiments of the present invention while configured accordingly. Thus, for example, when the processor 22 is embodied as an ASIC, FPGA or the like, the processor 22 may be specifically configured hardware for conducting the operations described herein. Alternatively, as another example, when the processor 22 is embodied as an executor of software instructions, the instructions may specifically configure the processor 22 to perform the operations described herein.

In an example embodiment, the processor 22 (or the processing circuitry 20) may be embodied as, include or otherwise control the message module 32, which may be any means, such as, a device or circuitry operating in accordance with software or otherwise embodied in hardware or a combination of hardware and software (e.g. processor 22 operating under software control, the processor 22 embodied as an ASIC or FPGA specifically configured to perform the operations described herein, or a combination thereof) thereby configuring the device or circuitry to perform the corresponding functions of the message module 32, as described below.

The message module 32 may include tools to facilitate message management via the network 16. In an example embodiment, the message module 32 may be configured to receive video message data and correlate the video message data with shipping data associated with one or more items, generate a packing slip with a unique identifier, receive a message retrieval request based on the unique identifier, and cause the video message data to be transmitted to a recipient user device.

In one or more embodiments, the processing circuitry 20 may include or be in communication with a camera 30. The camera 30 may be a digital camera configured to capture still or moving images. In some instances, the camera 30 may be integral to a user device, such as a cellular phone camera. Additionally or alternatively, the camera 30 may be an external camera, such as a USB connected web camera connected to a laptop or other user device. The camera 30 may be utilized to capture video message data with may be transmitted to a recipient directly or stored in a database, such as database server 19, for later transmission.

Example Method Flowcharts

Figure 3:
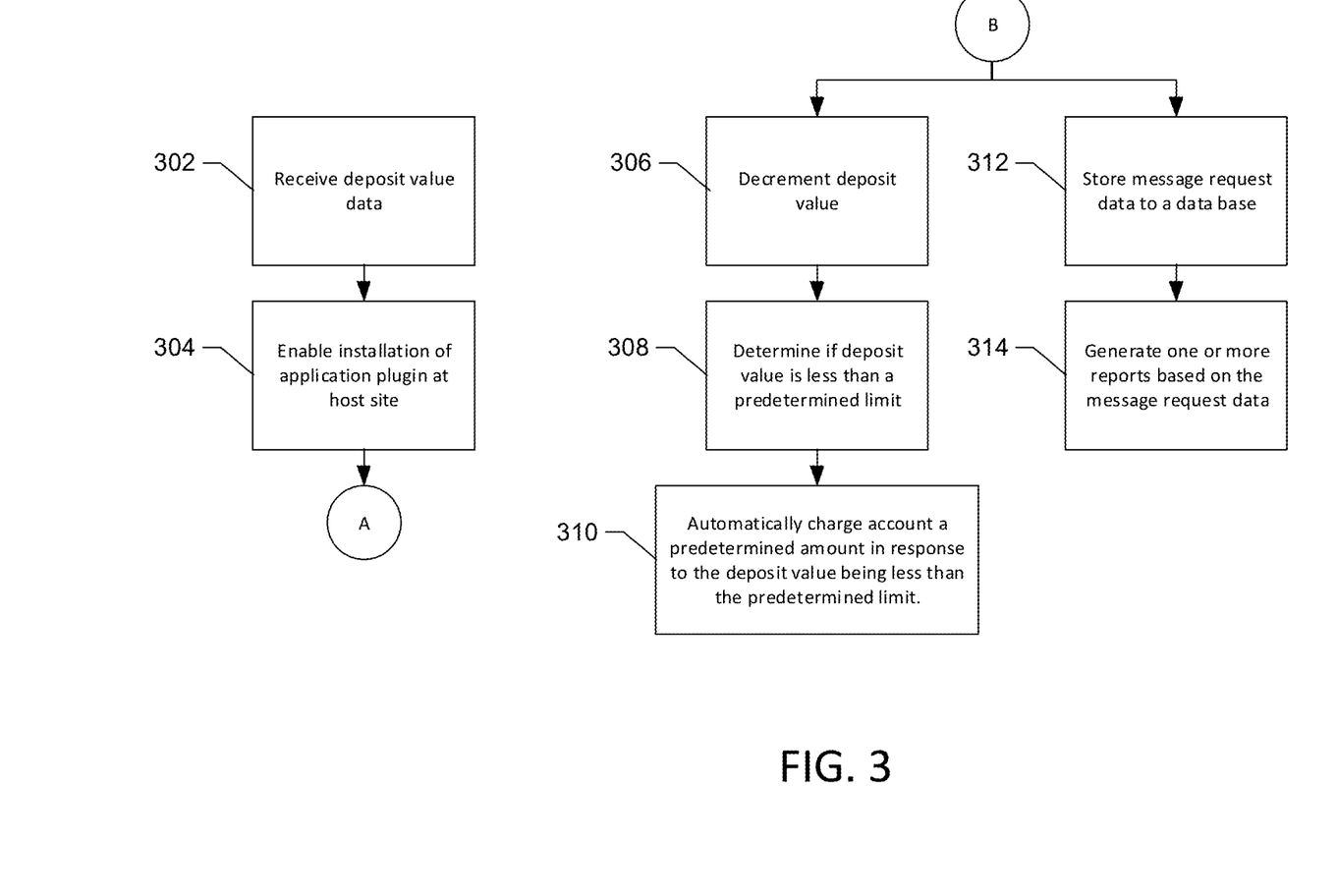
FIGS. 3-5 illustrate methods of automated message management according to an example embodiment.
Figure 4:
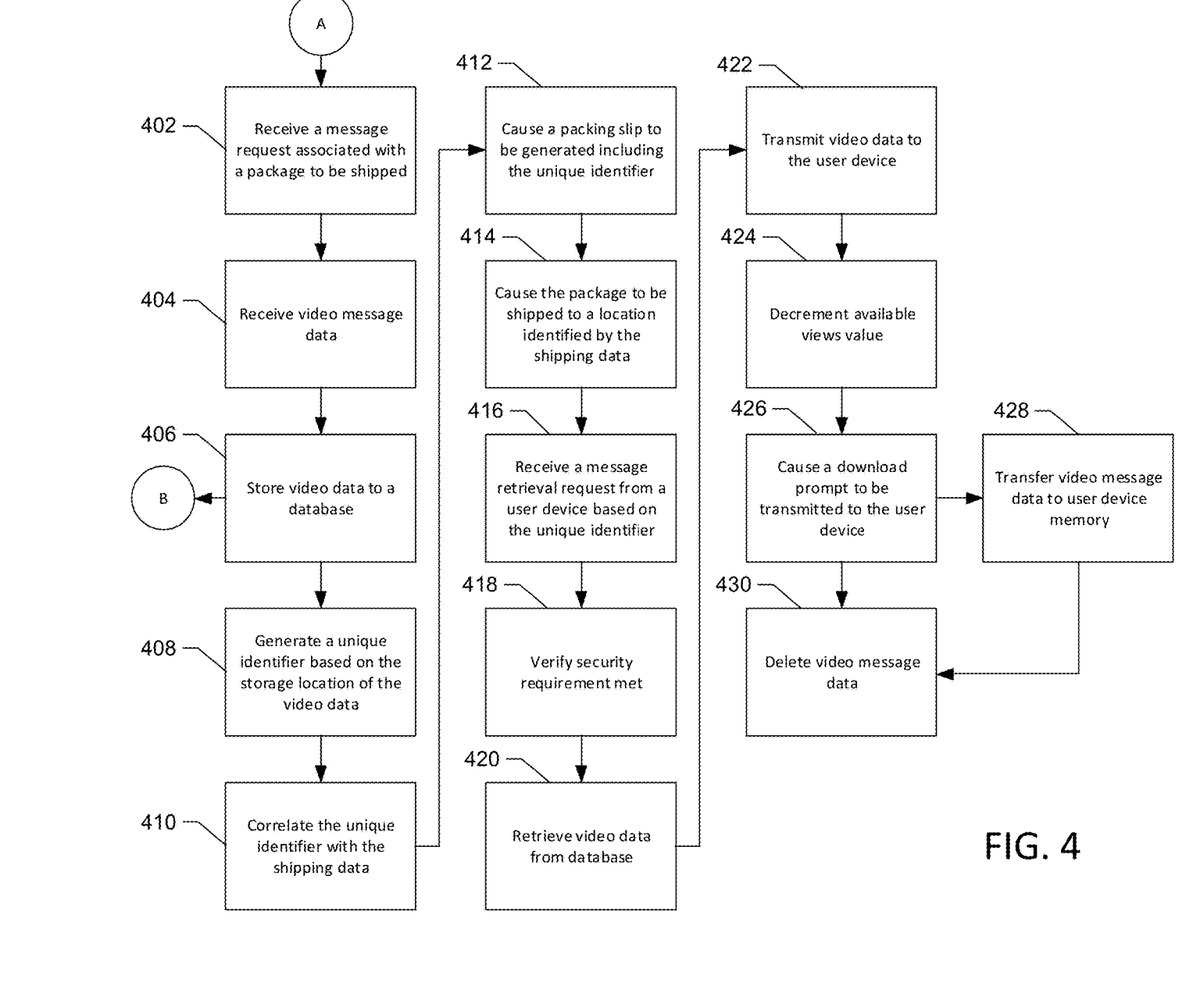
Figure 5:
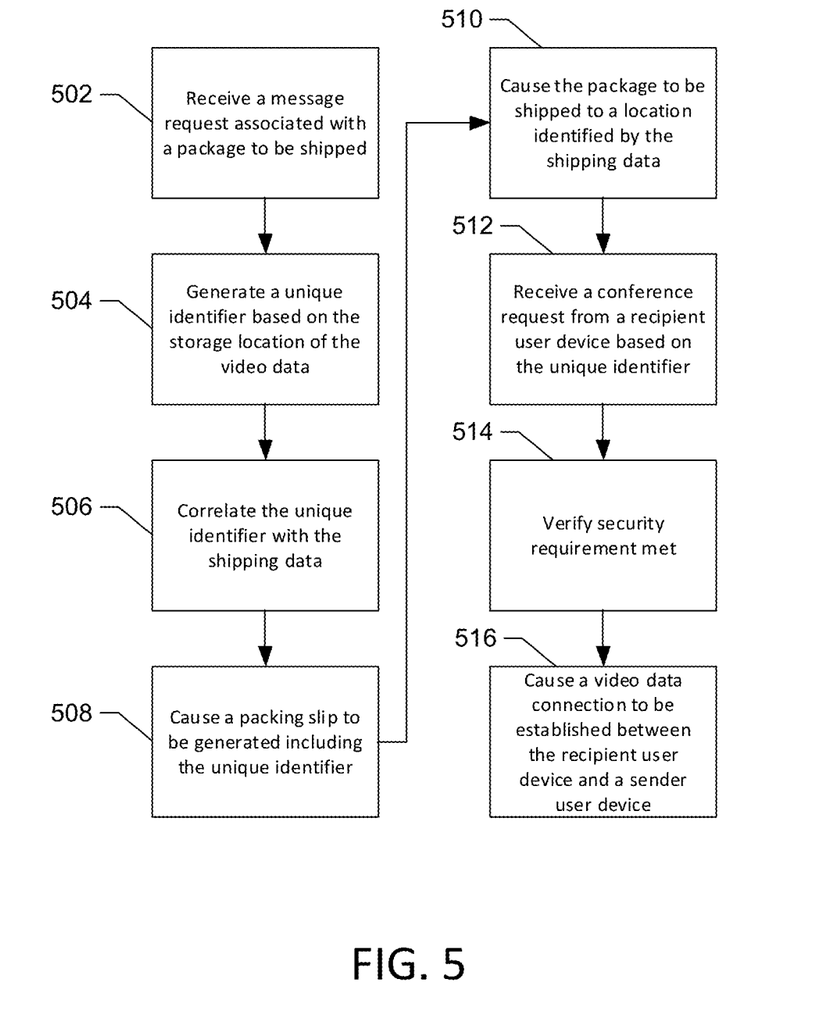

In some cases, a method of message management according to an example embodiment may be provided. FIGS. 3-5 illustrate block diagrams of some activities that may be associated with one illustrative example of such a method. In some embodiments, the processing circuitry 20 (which may include a processor capable of executing instructions stored in a non-transitory computer readable medium/ memory) may be configured to implement a control algorithm for the message platform according to the method.

In an example embodiment, the method may include receiving deposit value data at operation 302 of FIG. 3. The deposit value may be a deposit amount paid by the retailer to the operator of the message platform for usage of the message service. The processing circuitry 20 may receive an indication of a deposit from a retail merchant to a specified account. The indication of deposit may include, or serve as, a request to install a message application plugin or utility at a host website.

At operation 304, the method may include enabling installation and/or operation of the message application plugin or utility at the host website. The retailer may install the message application into the appropriate portion of the host website, such as a portion of the online order check out process. In some example embodiments, the message application include an actuation button or icon, which may be integrated into the checkout process screens, such as with gift wrapping, notes, and/or special instructions. Selection of the actuation button may cause the message application to cause a pop out screen to be displayed to guide a sender through a message capture process, as described below. At the conclusion of message capture process, the pop out screen may close automatically or in response to the user selection of a close icon.

Continuing at operation 402 of FIG. 4, the processing circuitry 20 may receive a message request associated with a package to be shipped. In an example embodiment, the message capture process includes sending at least a portion of the shipping details to the message platform, such as the delivery address, estimated delivery date, contact information for the sender and/or recipient, items in the package, or any other suitable information. The message request may include the shipping details which may be gathered by the message application from the fields filled out during the checkout process of the host website or entered in the message application during the message capture process.

In response to the message request, the message application may prompt the user to record a video message for the recipient, using a camera associated with the user device. In some embodiments, the user may review or edit the video message data, rerecord the video message data, delete the video message data, or the like. In an example embodiment, the user may upload a prerecorded video from a memory, such as a user device memory, an external memory, or the like. When the user is satisfied with the recorded video message data, the user may select upload, accept, or the like in the message application. The processing circuitry 20 may receive the video message data at operation 404.

The processing circuitry 20 may cause the message server 12 to store the video message data to memory, such as to database server 19, for later retrieval at operation 406.

At operation 408, the processing circuitry may generate a unique identifier for the video message data. The unique identifier may be a QR code, URL, simplified URL, alphanumeric code, or the like. In some embodiments, the unique identifier may include information for retrieval of the video message data, such as a storage location identifier.

The processing circuitry 20 may correlate the unique identifier with the shipping data at operation 410. The unique identifier may be correlated with an order number, a shipping label, a packing sheet, or the like. In an example embodiment, the processing circuitry 20 may cause a packing sheet or slip to be generated, e.g. printed including the unique identifier at operation 412. The packing sheet may be automatically placed in the package with the one or more ordered items or may be manually placed by a packer. The packing slip and/or unique identifier may be placed in a location within the package such that is noticeable to the recipient. For example, the packing slip may be placed or secured, such as by tape, to the top of the packing material, such that the packing slip may need to be moved to remove the items form the package. The packing slip may have instructions regarding the unique identifier to prompt the recipient, such as "The sender has left you a personal message. Please scan the QR code below or enter the URL into a web browser."

The processing circuitry 20 may cause the package to be shipped to a location identified by the shipping data at operation 414. The processing circuitry may indicate that the package is ready to ship and a packer may transfer the package to a carrier, such as a delivery service. In an embodiment, in which the packing process is automated the processing circuitry 20 may cause the package to be moved to the carrier and or a delivery vehicle.

The recipient may receive the package, such as at a post box or on their doorstep. Preferably before the recipient unwraps the packing material revealing the items, the recipient will locate the packing slip and follow the prompt to scan the QR code, enter the URL, or the like to retrieve the video message. Alternatively, the QR code may be presented on the exterior of the packaging, beneath a removable sticker, for example. In response to the recipient scanning the QR code or entering the URL on their user device, the processing circuitry 20 may receive a message retrieval request. The message retrieval request may based on, e.g. include at least a portion of the information associated with, the QR code, URL, or other unique identifier at operation 416.

In some example embodiments, the processing circuitry 20 may be configured to verify one or more security requirements have been met at operation 418. The security requirements, may ensure that the video message is retrieved only after package delivery to the delivery location specified in the shipping data and or retrieved by the person identified in the shipping data. Several security requirements are described below, however it would be immediately understood that these security requirements are merely illustrative and any suitable security requirement or combination of security requirements may be utilized.

In some example embodiments, the security requirements may include a geofence set around the delivery location, such as 100 meters, 0.25 miles, or the like. The processing circuitry 20 may verify any request for the video message originates from a user device within the geofence. The user device may be verified within the geofence by location data associated with the user device, such as GPS, proximity detection, or the like, or based on communication protocol identifiers, such as IP address, router identifiers, cell tower identifiers, or any other identifier in the communication path which identifies the user device location within the geofence.

In an example embodiment, the security requirement may be time based, such as enabling retrieval of the video message data only after a time period for deliver has expired or the carrier updating the package status as delivered. This may prevent persons in the delivery chain from accessing the video message data.

In some example embodiments, the security requirement may include authentication of an authentication code, which may be delivered separate from the package, such as by email, short message service (SMS), traditional mail, voice message, or the like. The processing circuitry 20 may prompt the recipient for the authorization code in response to receiving the message request. This may prevent persons other than the intended recipient from accessing the video, even after delivery at the delivery location.

In some example embodiments, the security requirement may include input of a password or answering a security question, each of which is unique to the recipient.

At operation 420, the processing circuitry may retrieve the video message data from the database. As discussed above the unique identifier may include an indication of the storage location of the video message data, which may be received by the processing circuitry 20 as a portion of the message retrieval request. The processing circuitry 20 may use the indication of the storage location to retrieve the video message data from the database.

At operation 422, the processing circuitry 20 may cause the video message to be transmitted to the recipient user device. The processing circuitry 20 may cause the video message data to be played on a user interface associated with the recipient user device, such as streamed in a video player application or internet interface. In an embodiment, the recipient is directed to a white-labeled landing page for the retailer wherein the video can be viewed. The landing page may contain the color-scheme of the retailer, images related to the retailer, advertising for the retailer, or the like. The video is preferably played before or with the unpacking/unwrapping of the items in the package, so that the personal message has a greater personal and emotional effect on the recipient than traditional impersonal packaging.

In some embodiments, the video message data may be stored in the database for a predetermined number of views. The video message data may be available for viewing 5 times, 10 times, or other suitable number of views. The processing circuitry 20 may decrement the number of available views, e.g. an available view value, each time the video is accessed or transmitted to the user device at operation 424.

In an example embodiment, the video message data may be downloaded to the recipient user device for retention and later playback. The processing circuitry 20 may cause a download prompt to be transmitted and/or displayed on the user device at operation 426. The download prompt may be displayed each time the video message data is viewed or may be transmitted in displayed at a predetermined available views value, such as 3 views, 2 views, 1 view, or the like. The prompt may include one or more action icons configured to cause an initiated of a transfer of the video message data from the database to the user device, such as a download icon, e.g. downward arrow.

In response to receiving a request to download the video message data, the processing circuitry 20 may cause the video message data to be transferred to the user device memory at operation 428.

At operation 430, the processing circuitry 20 may delete the video message data from the database. The processing circuitry 20 may delete the video message data based on transferring the video message data to the recipient user device or the available view value reaching zero. Additionally or alternatively, the video message data may be deleted after a predetermined amount of time being stored in the database. For example, the video message data may be stored for 10 days, 20, days, or other suitable time period after recording or first view of the video message data. In response to expiration of the predetermined time period, the video message data may be deleted.

Turning back to FIG. 3, in some example embodiments, the processing circuitry 20 may decrement the deposit value, at operation 306, based on each video message data stored to the data base at operation 406 of FIG. 4. As discussed above, the deposit value may be a deposit amount payed by the retailer to the operator of the message platform for usage of the message service. The storage of the video message data is indicative of use of the message application by the host website and therefore the deposit value may be charged for the video message service. In some embodiments, decrementing the deposit value occurs regardless of the video message data being viewed thereafter. In other embodiments, the deposit value is charged for each individual view of the video message or based upon the time spent viewing the video message (i.e. in the context of advertising material, for example). The decrement may be a predetermined value, such as $0.25, $0.50, $1.00, or the like, as agreed between the message platform provider and the retailer.

The message platform may be configured to ensure that at least a predetermined amount is prepaid for the message service. As such, the processing circuitry 20 may periodically, such as after each decrement, determined if the deposit value is less than a predetermined limit, such as $10, $20, $100 dollars, or other suitable amount. In an example embodiment, the predetermined limit may be based on the number expected, or historical, uses of the message platform per day, month, year, two week period, or other suitable interval.

In response to the deposit value failing to meet, e.g. being less than, the predetermined limit, the processing circuitry 20 may charge an account a predetermined amount at operation 310. The processing circuitry 20 may charge a bank account, credit card, or other financial account. The predetermined amount of the charge may be $5, $10, $100, or other suitable amount to maintain the deposit value above the predetermined limit for a suitable period.

In some example embodiments, the message platform 12, and/or processing circuitry 20, may be configured to disable the message application plugin or utility at one or more retailer host websites. The message platform may include automatic disabling of the message application, such as in response to a deposit value reaching zero or other predetermined value. Additionally or alternatively, the message platform may receive user input to disable the message application at one or more retailer host websites. In such an instance, the actuation button may be removed or become inactive, e.g. grayed, during the period in which the message application is disabled.

Additionally or alternatively, the message platform and/or the host website may add an additional service charge to the checkout price for utilization of the message service. For example, the processing circuitry 20 may add a charge of $1.50, $2.00, or other suitable amount to the checkout amount. The additional charge may be per package, per stored video message, or the like.

In some embodiments, the message platform 12 may be further configured to generate analytic data for the message platform, individual retailers, service industry categories, or any other suitable categories. As such, the processing circuitry 20 may store message request data to a database, such as the database server 19, at operation 312.

The processing circuitry 20 may generate one or more analytics reports based on the message request data at operation 314. The analytics reports may include the number of video messages for each retailer, the sender or delivery areas associated with the video messages, such as a heat map, a breakout of industries or retailers associated with the video messages, or any other suitable analytic.

Turning to FIG. 5, in an example embodiments, the unique identifier may be utilized to establish video or telephonic communication between the recipient's user device and the sender's user device. For example, the QR code may cause a web based communication interface to open on the recipient user device and call the sender. The sender may answer the web call and be virtually present for the opening of the package. Some of the operations of the method depicted in FIG. 5 may be substantially similar to the operations discussed above in regard to the operations of FIG. 4.

Similar to operations 402 and 404, the processing circuitry 20 may receive a message request associated with a package to be shipped at operation 502 and generate a unique identifier at operation 504. However, the unique identifier may not be associated with a stored video message data.

At operation 506, the processing circuitry 20 may correlate the unique identifier with at least a portion of the shipping data, such as contact information including, but not limited to user ID's for video conferencing services, telephone numbers for the sender, or any other suitable contact information to enable video or telephonic conferencing.

Operations 508 and 510 may be substantially similar to operation 412 and 414 including causing the packing slip to be generated including the unique identifier at operation 508 and causing the package to be shipped to the location identified in the shipping data at operation 510.

At operation 512 the processing circuitry may cause a receiving a conference request from a user device based on the unique identifier. Similar to operation 416, the conference request may be generated based on scanning a QR code, entering a URL, or other unique identifier. In some embodiments, the processing circuitry 20 may verify security requirements at operation 514, similar to operation 418.

The processing circuitry 20 may video or telephonic communication connection to be established between the recipient user device and the sender's use device at operation 516. The processing device may utilize one or more of the conference service identifiers, telephone numbers of the like to establish a video or teleconference between the recipient's user device and the senders' user device. Thus enabling the sender to be virtually present at the time of opening the package.

Figure 6:
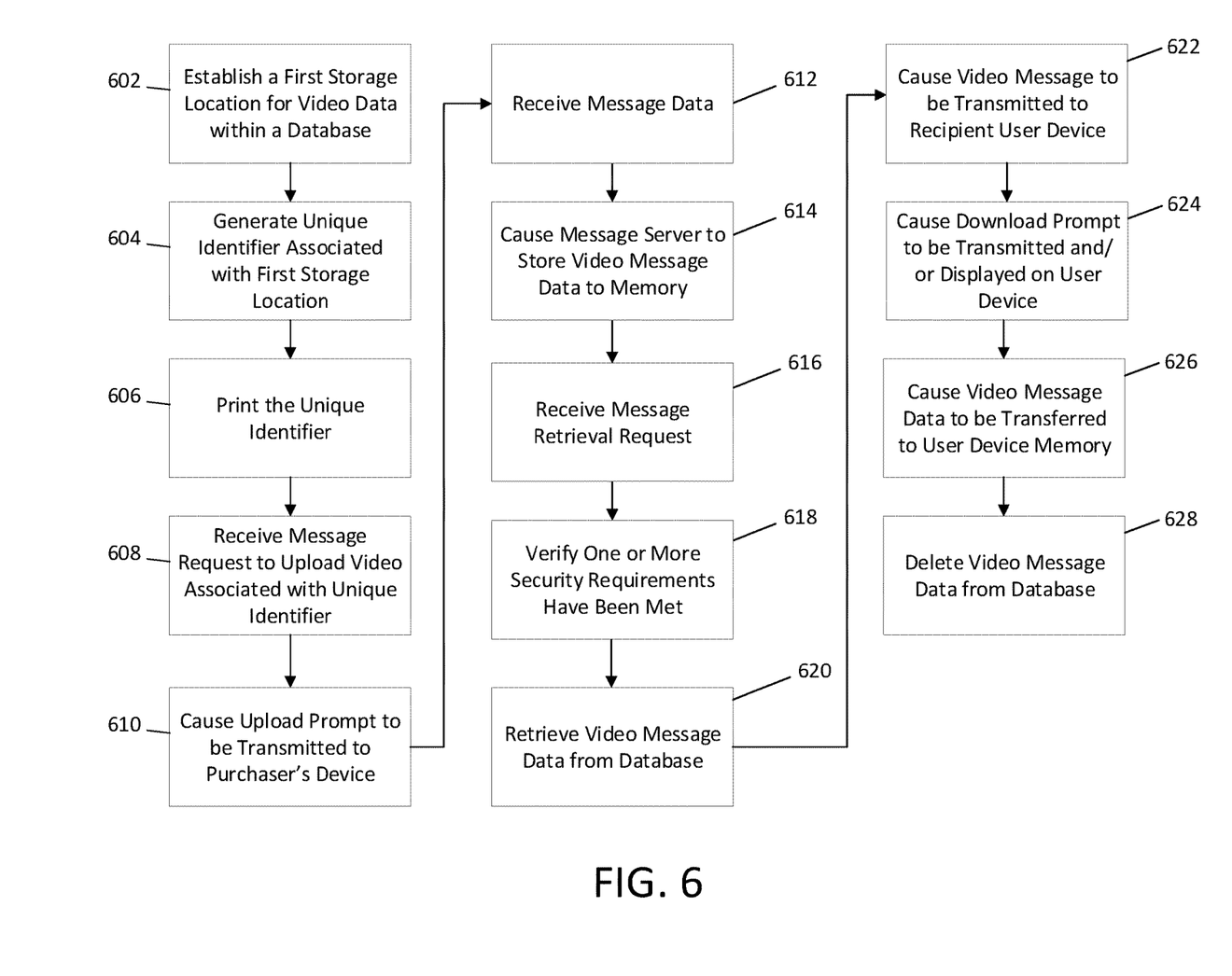
FIG. 6 illustrates a flow chart according to one embodiment of the invention.

An alternate embodiment is set forth in FIG. 6. In this example, a QR code (or other unique identifier is provided on or with the physical item at the time of an in-store purchase.

The processing circuitry 20 may establish a first storage location for video data within a database at step 602. At step 604, the processing circuitry 20 may generate a first QR code of other unique identifier associated with the first storage location. The unique identifier may be a QR code, URL, simplified URL, alphanumeric code, or the like. In some embodiments, the unique identifier may include information for retrieval of the video message data, such as a storage location identifier.

At step 606, the system may then print the first QR code on an item to be purchased (i.e. printed on a gift card during the manufacturing process), print the first QR code on a label, tag, or packaging associated with the item, print the first QR code on a gift receipt at the time of purchase, or anything of the like. Any manner of printing the first QR code may be utilized in this embodiment as long as the QR code is associated with the item to be purchased or having been purchased, in some way.

At step 608, the processing circuitry 20 may then receive a message request from a user device to upload a video associated with the first QR code. In an example, the purchaser buys a board game for his grandchild and exits the retailer's store. The purchaser may then scan the QR code with the camera on his mobile phone, sending a message request to the processing circuitry.

The processing circuitry 20 may then cause an upload prompt to be transmitted to the purchaser's mobile phone at step 610. As set forth above, in an example embodiment, the message capture process may include recording an audio or video message for the recipient, using a camera associated with the user device. The processing circuitry 20 may receive the video message data at step 612. The processing circuitry 20 may, at step 614, cause the message server 12 to store the video message data to memory, such as to database server 19 in a first storage location for later retrieval.

The recipient may receive the package, such as at a post box or on their doorstep. Preferably before the recipient unwraps the packing material revealing the items, the recipient will locate the QR code and follow instructions to scan the QR code, enter the URL, or the like to retrieve the video message. Alternatively, the QR code may be presented on the exterior of the packaging, beneath a removable sticker, for example. In response to the recipient scanning the QR code or entering the URL on their user device, the processing circuitry 20 may receive a message retrieval request at step 616. The message retrieval request may based on, e.g. include at least a portion of the information associated with, the QR code, URL, or other unique identifier.

In some example embodiments, the processing circuitry 20 may be configured to verify one or more security requirements have been met at operation 618.

At operation 620, the processing circuitry may retrieve the video message data from the database. As discussed above the unique identifier may include an indication of the storage location of the video message data, which may be received by the processing circuitry 20 as a portion of the message retrieval request. The processing circuitry 20 may use the indication of the storage location to retrieve the video message data from the database.

At operation 622, the processing circuitry 20 may cause the video message to be transmitted to the recipient user device. The processing circuitry 20 may cause the video message data to be played on a user interface associated with the recipient user device, such as streamed in a video player application or internet interface.

In an example embodiment, the video message data may be downloaded to the recipient user device for retention and later playback. The processing circuitry 20 may cause a download prompt to be transmitted and/or displayed on the user device at operation 624. In response to receiving a request to download the video message data, the processing circuitry 20 may cause the video message data to be transferred to the user device memory at operation 626. At operation 628, the processing circuitry 20 may delete the video message data from the database.

In an example embodiment, the message platform may comprise a processor (e.g. the processor 22) or processing circuitry 20 configured to perform some or each of the operations (302-314, 402-430, 502-516) described above. The processor 22 may, for example, be configured to perform the operations (302-314, 402-430, 502-516) by performing hardware implemented logical functions, executing stored instructions, or executing algorithms for performing each of the operations.

In some embodiments, the processor 22 or processing circuitry 20 may be further configured for additional operations or optional modifications to operations 302-314, 402-430, 502-516. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method comprising:
    receiving a message request associated with a package to be shipped;
    receiving video message data;
    storing the video message data to a database;
    generating a unique identifier based on the storage location of the video message data in the database;
    correlating the unique identifier with shipping data associated with the package;
    causing a packing slip to be generated including the unique identifier;
    causing the package to be shipped to a location identified by the shipping data;
    receiving a message retrieval request from a recipient device based on the unique identifier;
    receiving location information based on a device location of the recipient device when sending the message retrieval request;
    determining whether the device location is valid by comparing the location information to the location identified by the shipping data;
    in response to determining that the device location is valid, retrieving the video message data from the database based on the unique identifier;
    transmitting the video message data to the recipient device;
    storing, after storing the video message data to the database, message request data to the database; and
    generating, after storing the video message data to the database, one or more analytics reports based on the message request data;
    wherein transmitting the video message data to the recipient device includes transmitting a customizable landing page having the video message data to the recipient device;
    wherein the customizable landing page is configured to present a company logo;

wherein the customizable landing page is configured to permit customization of text, backgrounds, and borders to fit company branding; and wherein the customizable landing page is configured to present images and advertising related to a retailer.

2. The method of claim 1, further comprising deleting the video message data.

3. The method of claim 2, further comprising:
receiving an indication that the video message data has been viewed;
decrementing a number of available views after receiving the indication that the video message data has been viewed; and
deleting the video message data from the database when the number of available views equals zero.

4. The method of claim 2, further comprising:
initiating a timer after storing the video message data to the database; and
deleting the video message data when the timer has expired.

5. The method of claim 1, wherein the one or more analytics reports provide a number of times the video message data was accessed, a sender location associated with the video message data, and a delivery location associated with the video message data.

6. The method of claim 2, further comprising:
initiating a timer after storing the video message data to the database; and
enabling retrieval of the video message data only after a time period for delivery has expired on the timer.

7. The method of claim 2, further comprising enabling retrieval of the video message data only after receiving a notification that the package has been delivered.

8. The method of claim 1, wherein the package is associated with a seller, further comprising:
associating the video message data with a landing page unique to the seller;
transmitting the video message data and the landing page to the recipient device; and
collecting message request data, wherein the message request data includes at least one of a length of time on the landing page and a number of times that the landing page was visited.

9. The method of claim 8, wherein the seller is a retailer, distributor, or manufacturer.

10. The method of claim 8, wherein the landing page is customizable by the seller.

11. The method of claim 8, wherein the landing page comprises a logo, images, or branding associated with the seller.

12. A non-transitory computer readable medium having stored thereon software instructions that, when executed by a processor, cause the processor to:
receive a message request associated with a package to be shipped;
receive video message data;
store the video message data to a database;
generate a unique identifier based on the storage location of the video message data in the database;
correlate the unique identifier with shipping data associated with the package;
cause a packing slip to be generated including the unique identifier;
cause the package to be shipped to a location identified by the shipping data;
receive a message retrieval request from a recipient device based on the unique identifier;
receive location information based on a device location of the recipient device when sending the message retrieval request;
determine whether the device location is valid by comparing the location information to the location identified by the shipping data;
in response to determining that the device location is valid, retrieve the video message data from the database based on the unique identifier;
transmit the video message data to the recipient device;
store, after storing the video message data to the database, message request data to the database; and
generate, after storing the video message data to the database, one or more analytics reports based on the message request data;
wherein transmitting the video message data to the recipient device includes transmitting a customizable landing page having the video message data to the recipient device;
wherein the customizable landing page is configured to present a company logo;
wherein the customizable landing page is configured to permit customization of text, backgrounds, and borders to fit company branding; and
wherein the customizable landing page is configured to present images and advertising related to a retailer.

13. The non-transitory computer readable medium of claim 12, wherein the non-transitory computer readable medium has further stored thereon software instructions that, when executed by a processor, cause the processor to delete the video message data.

14. The non-transitory computer readable medium of claim 13, wherein the non-transitory computer readable medium has further stored thereon software instructions that, when executed by a processor, cause the processor to:
receive an indication that the video message data has been viewed;
decrement a number of available views after receiving the indication that the video message data has been viewed; and
delete the video message data from the database when the number of available views equals zero.

15. The non-transitory computer readable medium of claim 13, wherein the non-transitory computer readable medium has further stored thereon software instructions that, when executed by a processor, cause the processor to:
initiate a timer after the video message data is stored to the database; and
delete the video message data when the timer has expired.

16. A system for the secure transmission of a message with a delivered package, the system comprising:
a recipient device;
a sender device;
a message platform, said message platform comprising an application server;
wherein, one of the components selected from the group consisting of the sender device and the application server comprises a processor and a memory, wherein the memory comprises stored thereon software instructions that, when executed by the processor, cause the processor to:
receive a message request associated with a package to be shipped;
receive video message data;
store the video message data to a database;
generate a unique identifier based on the storage location of the video message data in the database;

correlate the unique identifier with shipping data associated with the package;
cause a packing slip to be generated including the unique identifier;
cause the package to be shipped to a location identified by the shipping data;
receive a message retrieval request based on the unique identifier;
receive location information based on a device location of the recipient device when sending the message retrieval request;
determine whether the location of the recipient device is valid by comparing the location information to the location identified by the shipping data;
in response to determining that the device location is valid, retrieve the video message data from the database based on the unique identifier;
transmit the video message data to the recipient device;
store, after storing the video message data to the database, message request data to the database; and
generate, after storing the video message data to the database, one or more analytics reports based on the message request data;
wherein transmitting the video message data to the recipient device includes transmitting a customizable landing page having the video message data to the recipient device;
wherein the customizable landing page is configured to present a company logo;
wherein the customizable landing page is configured to permit customization of text, backgrounds, and borders to fit company branding; and
wherein the customizable landing page is configured to present images and advertising related to a retailer.

17. The system of claim 16, wherein the memory further comprises stored thereon software instructions that, when executed by the processor, cause the processor to delete the video message data.

18. The system of claim 17, wherein the memory further comprises stored thereon software instructions that, when executed by the processor, cause the processor to:
receive an indication that the video message data has been viewed;
decrement a number of available views after receiving the indication that the video message data has been viewed; and
delete the video message data from the database when the number of available views equals zero.

\* \* \* \* \*